United States Patent [19]

Zakharov et al.

[11] 4,081,955

[45] Apr. 4, 1978

[54] REGULATING SYSTEMS FOR TWO-SHAFT GAS-TURBINE ENGINE

[76] Inventors: Nikolai Nikolaevich Zakharov, ulitsa Dmitria Ulyanova, 9/11, korpus 2, kv. 64, Moscow; Evgeny Borisovich Paramonov, ulitsa Volodarskogo, 50, kv. 50, Yaroslavl, both of U.S.S.R.

[21] Appl. No.: 759,376

[22] Filed: Jan. 14, 1977

[51] Int. Cl.² .............................................. F02C 9/04
[52] U.S. Cl. ............................ 60/39.16 S; 60/39.28 R
[58] Field of Search ................... 60/39.16 S, 39.16 R, 60/39.28 R

[56] References Cited

U.S. PATENT DOCUMENTS

| | | | |
|---|---|---|---|
| 3,188,807 | 6/1965 | Rogers | 60/39.16 S |
| 3,237,404 | 3/1966 | Flanigan et al. | 60/39.16 S |
| 3,266,248 | 8/1966 | Leslie | 60/39.16 S |
| 3,744,241 | 7/1973 | Muller et al. | 60/39.16 S |
| 3,899,877 | 8/1975 | Flanigan et al. | 60/39.16 S |

*Primary Examiner*—Robert E. Garrett
*Attorney, Agent, or Firm*—Haseltine, Lake & Waters

[57] ABSTRACT

The disclosed regulating system is intended for incorporation in two-shaft gas-turbine engine for a road vehicle, wherein a hydraulically controlled torque-transmitting device is interposed between the respective shafts of the turbocompressor and of the power turbine. The system includes in all-speed governor of the rpm value of the turbocompressor. The metering device of this governor is cut into the hydraulic line controlling the torque-transmitting device and is controlled itself by signals coming from a pickup responsive to the rpm value of the turbocompressor. The mechanism for tuning this pickup is operatively connected with the "gas" pedal. The system further includes a fuel feed governor included into the fluid supply line of the engine and controlled by the pressure downstream of the compressor. The system also includes an all-speed governor of the rpm value of the power turbine shaft comprising a metering device included into the fuel supply line of the engine and controlled by signals coming from a pickup responsive to the rpm value of the power turbine shaft. The tuning mechanism of the last-mentioned pickup is operatively connected with the tuning mechanism of the pickup responsive to the rpm value of the turbocompressor, for timed variation of the tuning of these two pickups. The disclosed system provides for stable running of the engine at low loads and throughout coasting and engine braking periods, as well as reliable regulation of the maximum angular speed of the turbocompressor and stable operation of the latter in the minimum speed duty, with disengaged torque-transmitting device.

3 Claims, 1 Drawing Figure

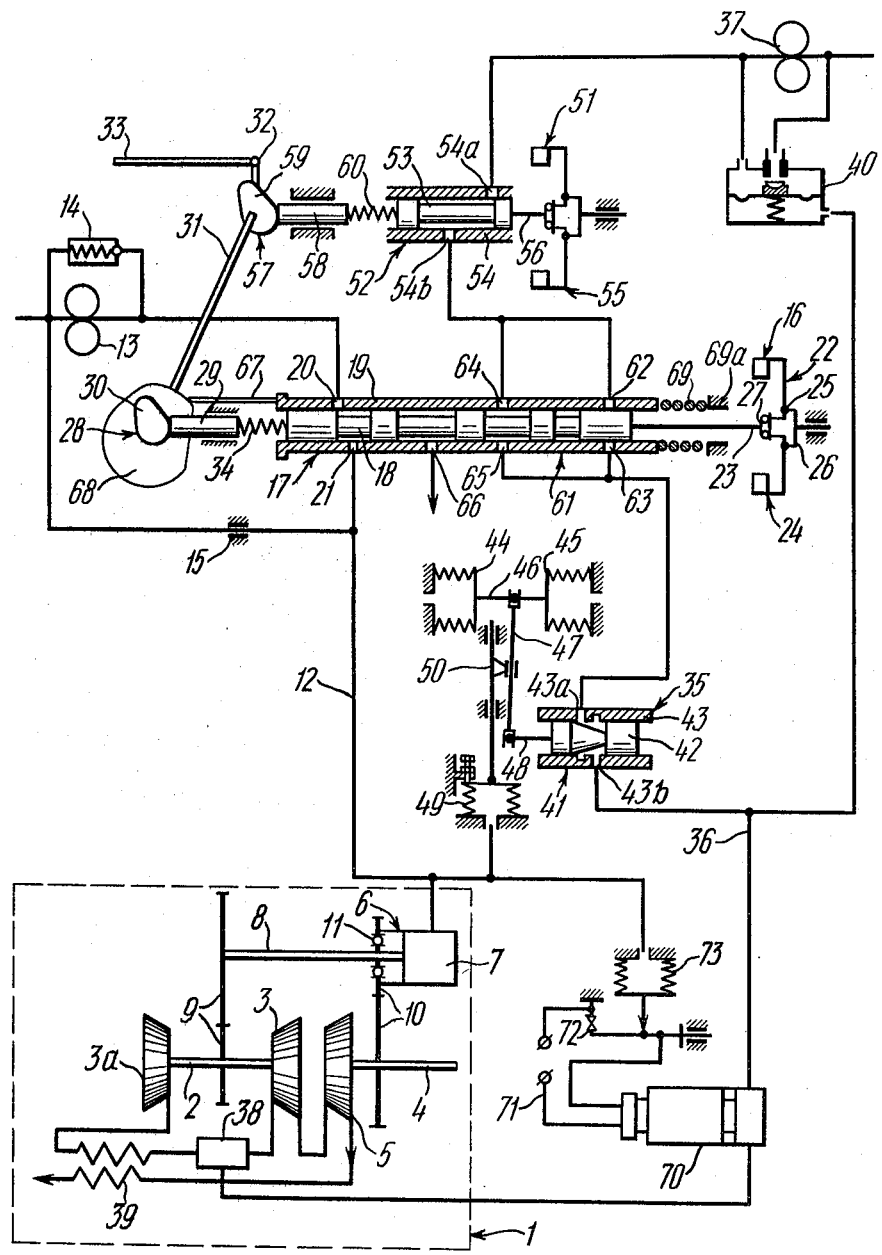

REGULATING SYSTEMS FOR TWO-SHAFT GAS-TURBINE ENGINE

The invention relates to gas-turbine engines and, more particularly, it relates to regulating systems incorporable in two-shaft gas-turbine engines.

The invention can be employed to utmost effectiveness in regenerative car and truck gas-turbine engines using controlled torque transmission between the turbocompressor and the power turbine However, a regulating system constructed in accordance with the present invention can be also utilized in gas-turbine engines mounted in helicopters, on ships and in locomotives.

At present, great importance is attached to the development of gas-turbine engines for road vehicles, for such engines have been found to reduce the overall weight and dimensions of the power plant, to step up the capacity of a road vehicle, to cut down maintenance costs and to significantly curb the exhaust of toxic substances into atmosphere with exhaust gases.

Particularly attractive for incorporation in road tractors and like vehicles, as well as in off-road vehicles, such as field tractors are two-shaft gas-turbine engines with controllable transmission of torque between the turbocompressor and the power turbine. Alongside with line traction ratings and high economy at fractional loads, engines of this kind offer adequately high braking characteristics. Here and in the disclosure to follow, the expression "fractional load" is used to describe a load of the engine, or else the power output developed by the engine, of which the value is short of the rated load/power outout value of the engine in question (i.e. the maximum rated power output in the engine's specifications).

In some gas-turbine engines with controllable transmission of torque there are employed regulating systems of a relatively complicated structure. Beside controlling the fuel feed, the system is expected to regulate the value of the torque transmitted between the turbocompressor and the power engine, as well as to maintain the preset program of varying the gas temperature in accordance with the varying operating duty of the engine.

The most simple and reliable are those systems wherein stabilization of the angular speed revolutions-per-minute or rpm value of the turbocompressor is effected by a governor influencing the torque being transmitted, while the preset program or law of variation of the gas temperature is effected by the corresponding tuning of the fuel feed governor controlled by the pressure at the outlet of the compressor. This fuel feed governor, by metering the fuel feed in accordance with the air pressure delivered by the compressor of the engine, maintains the preset law of variation of the gas temperature both at stable running duties and at acceleration of the turbocompressor.

There is known a regulating system for a two-shaft gas-turbine engine with a hydraulically controlled torque-transmitting device interposed between the turbocompressor and the power turbine, comprising an all-speed governor of the rpm value of the turbocomprssor, controlling the value of the torque being transmitted thereto. The tuning mechanism of this governor is connected with the "gas" or "throttle" pedal of the vehicle (i.e. the accelerator pedal which is commonly referred to as the "gas" pedal).

The abovespecified known regulating system further comprises a fuel feed governor metering the fuel feed in accordance with the pressure downstream of the engine's compressor and thus maintaining the preset gas temperature at the inlet of the compressor drive turbine.

In the abovespecified hitherto known system the governor of the turbocompressor maintains a preset speed mode by varying the value of the torque transmitted to the power turbine and, hence, by varying the load of the turbocompressor. When the fuel feed is metered in accordanc with the pressure downstream of the compressor, a set speed of the turbocompressor can be attained only at a gas temperature corresponding to the selected tuning of the fuel feed governor controlled by the pressure downstream of the compressor.

One of the major drawbacks of the abovespecified known system is the fact that when the load applied to the shaft of the power turbine considerably lowers, the turbocompressor displays a tendency to loss the stability of its running, i.e. to self-initiate an rpm increase.

This situation is caused by the fact that the tuning of the fuel feed governor in such that at any given duty it maintains the maximum gas temperature. As a result, a surplus torque is developed at the turbocompressor shaft, this torque increasing as the rpm value increases. This is what causes the uncontrollable building up of the rpm value when the load applied to the output shaft of the engine drops.

The same reason would not let an engine incorporating the abovespecified hitherto known regulating system be used for engine-braking purposes, because in this case the torque developed at the engine shaft would not only drop to zero, but change its direction altogether.

Another shortcoming of the hitherto known system is the slowed-down reduction of the rpm value of turbocompressor while the power output of the engine is being adjusted, because this reduction of the rpm value is attained solely by increasing the load of the turbocompressor with aid of the torque-transmitting device. Meanwhile, the regulating system would feed the fuel in an amount required for maintaining the maximum gas temperature.

Another disadvantage of the known system is the fact that at an "idling" duty when the turbocompressor runs at a minimum rpm value, stabilization of its running is likewise effected by controlling the value of the torque transmitted from the turbocompressor to the power turbine.

This leads to an increased value of the waste power at the output shaft of the engine, and, consequently, to waste of fuel.

Under the "waste power" we mean the power developed by the idling engine, which is not required for the motion of the vehicle, while consuming a surplus amount of fuel, which makes this "waste power" highly undesirable.

Another still shortcoming of the hitherto known abovespecified regulating system is that the maximum rpm value of the turbocompressor is not therein limited with an adequate reliability, although this limitation constitutes one of the main prerequisites for the safe performance of the engine.

Should the load applied to the output shaft of the engine drop significantly, with the turbocompressor running close to its maximum rpm value, the turbocompressor might exceed this maximum value.

It is the main object of the present invention to create a regulating system for a two-shaft gas-turbine engine, of a structure providing for stable running of the engine under any and all traction and braking duties.

It is another object of the present invention to create a regulating system for a two-shaft gas-turbine engine, which should be of a structure providing for a reliable operation in combination with a design that is more simple and easier to manufacture in comparison with the hitherto known systems.

This object is attained in a regulating system for two-shaft gas-turbine engine, wherein a hydraulically controlled torque-transmitting device is interposed between the turbocompressor shaft and the power turbine shaft, the system comprising an all-speed governor of the rpm value of the turbocompressor shaft, having a metering device included into the hydraulic control line of the torque-transmitting device and controlled by signals coming from a pickup responsive to the rpm value of the turbocompressor shaft, the tuning mechanism of this pickup being operatively connected with the "gas" pedal, and a fuel feed governor included into the fuel supply line of the engine and controlled in accordance with the pressure downstream of the turbocompressor, which system, according to the present invention, further comprises an all-speed governor of the rpm value of the power turbine, having a metering device included into the fuel supply line of the engine and controlled by signals coming from a pickup responsive to the rpm value of the power turbine shaft, the tuning mechanism of the last-mentioned pickup being operatively connected with the tuning mechanism of the aforementioned pickup responsive to the rpm value of the turbocompressor shaft, for timed variation of the tuning of these two pickups.

With the regulating system having the abovedescribed structure, the all-speed governor of the rpm value of the power turbine provides for stable running of the engine in any and all traction and braking modes.

This governor comes into action when the relative speeds of rotation of the turbocompressor and of the power turbine become equal. We understand under the "relative" speed of rotation of either the turbocompressor or the power turbine the ratio of their actual speed to their maximum rated speed.

The abovementioned situation might develop as the rpm value of the power turbine rises on account of the reduced load applied to the shaft of this power turbine of the engine. Now, if the load drops still further, the rpm value of the power turbine, preset by the respective position of the "gas" pedal, will be maintained permanent by cutting down the fuel feed with the aid of said governor.

The rpm value of the power turbine shaft is stabilized in a similar manner while the vehicle is engine-braked, when the torque is being consumed by the turbocimpressor.

It is expedient that the regulating system should comprise an additional metering device included into the fuel supply line of the engine, controlled by signals coming from the pickup responsive to the rpm value of the turbocompressor shaft and adapted to be operated in alternation with the metering device of the all-speed governor of the rpm value of the turbocompressor shaft.

A regulating system constructed in accordance with the present invention does away with the shortcomings of the abovespecified hitherto known system, associated with inadequately reliable limitation of the maximum speed of rotation of the turbocompressor and with an increased fuel consumption under minimum speed duties, with aid of the additional metering device included into the fuel supply line.

When the governor of the turbocompressor is tuned to either the maximum rpm value or the minimum rpm value, the metering device in the control line of the torque-transmitting device is made inoperative, and the additional metering device in the fuel supply line is made operative.

The aforesaid switching over of the metering devices is effected with aid of their operative connection with the mechanism of joint tuning of the respective rpm value governors of the turbocompressor and of the power turbine.

Consequently, in the maximum and minimum rpm modes the torque-transmitting device is rendered inoperative, and the rpm value governor of the turbocompressor maintains the preset speed duty by influencing the fuel feed.

Owing to this, there is effected reliable limitation of the rpm value of the turbocompressor with a high accuracy, which ensures safe performance of the engine with a transmission of any kind.

On the other hand, stabilization of the minimum rpm mode is effected exclusively by adjusting the fuel feed with the torque-transmitting device being rendered inoperative, which ensures that the consumption of fuel in this mode is at the minimum.

It is further expedient that in a regulating system constructed in accordance with the invention the metering device of the governor of the rpm value of the turbocompressor shaft and the additional metering device should be in the form of two coaxial, rigidly connected spool valves controlled by signals coming from the pickup responsive to the rpm value of the turbocompressor shaft and received within a common sleeve having passages for connection, respectively, with the hydraulic control line of the torque-transmitting device and with the fuel supply line of the engine, the sleeve being operatively connected with the "gas" pedal for displacement in accordance with the position of the "gas" pedal, in which way alternative operation of the two metering devices should be effected.

The aforesaid structure of the two metering devices associated with the governor of the rpm value of the turbo-compressor enables to simplify the design of the regulating system, and thus to make the performance of the whole system more dependable.

Furthermore, the use of the common movable sleeve of the metering devices as the switching-over member creates fine conditions for automating the switching-over operation, and also provides for perfect synchronization of the operation of switching over the metering devices, which is particularly important during transient periods.

The herein disclosed regulating system for a two-shaft gas-turbine engine provides for steady running of the engine at low loads and in the engine-braking mode.

Moreover, a regulating system constructed in accordance with the present invention ensures reliable limitation of the maximum rpm value of the turbocompressor, as well as a dependable performance thereof in a minimum speed mode, with the torque-transmitting device disengaged.

The disclosed regulating system is capable of swiftly and efficiently reducing the rpm value of the engine, and, hence, the power output of this engine.

The disclosed system is simple in manufacture and reliable in operation. In addition, the herein disclosed system may incorporate various component parts and assemblies of the existing hitherto known systems.

Given hereinbelow is a description of an embodiment of the present invention, with reference being had to the accompanying drawing schematically illustrating a regulating system for a two-shaft gas-turbine engine, constructed in accordance with the present invention.

The described regulating system is incorporated in the two-shaft gas-turbine engine of a road vehicle. In this engine, generally indicated with numberal 1, the shaft 2 of the turbocompressor 3 and the shaft 4 of the power turbine 5 are interconnected through a device 6 for transmitting the torque from this shaft 2 of the turbocompressor 3 to the shaft 4 of the power turbine 5.

The torque-transmitting device 6 includes a multi-disc clutch 7 mounted on an intermediate shaft 8 operatively connected via a gear train 9 to the shaft 2 of the turbocompressor 3. The driven member (not shown) of the clutch 7 is drivingly connected via another gear train 10 to the shaft 4 of the power turbine 5.

To transmit a torque in the opposite direction within periods when the vehicle is engine-braked, the torque-transmitting device of the presently described embodiment incorporates an overruning clutch 11 which may be of any suitable known structure. In the driving sense, the overrunning clutch 11 is arranged in parallel with the friction clutch 7 and is also mounted on the intermediate shaft 8.

The clutch 7 is of a controllable type wherein the value of the transmitted torque is adjustable by varying the pressure in the hydraulic, e.g. oil line 12 belonging to the regulating system of the engine 1.

The oil line 12 includes an oil pump 13 for delivering oil coming from an oil source (not shown).

Connected in parallel with the pump 13 to the oil line 12 is a pressure-relief valve 14 adapted to maintain a permanent pressure of the oil delivered by the pump 13. The valve 14 may be of any known per se structure suitable for the purpose.

Furthermore, the oil line 12 includes a throttle 15 connected to the inlet of the pump 13. The function of this throttle 15 is to meter the amount of oil supplied from the line 12 to the inlet of the pump 13.

The regulating system being described includes an all-speed governor 16 of the rpm value of the shaft 2 of the turbocompressor 3. The function of the all-speed governor 16 is to maintain a preselected (by the driver of the vehicle) speed of rotation of the shaft 2 of the turbocompressor 3 within the working range of the rpm values of the latter, i.e. within the range between the maximum and minimum rpm values rated in the specifications of the engine of the road vehicle.

The all-speed governor 16 of the rpm value of the shaft 2 of the turbocompressor 3 includes a metering device 17 in the form of a spool valve 18 received in a sleeve 19. The sleeve 19 has provided therein passages 20 and 21 which are, respectively, the inlet and outlet passages communicating with the oil line 12. The inlet passage 20 is connected to the outlet of the pump 13, to have the oil under pressure supplied into the metering device 17, while the outlet passage 21 is connected to the portion of the oil line 12, connected to the clutch 7, to control the pressure in this portion of the oil line 12.

The governor 16 of the presently described embodiment includes a centrifugal pickup 22 responsive to the speed of rotation of the shaft 2 of the turbocompressor 3, arranged coaxially with the spool valve 18 and rigidly connected therewith via a rod 23, to control the position of the spool valve 18.

The pickup 22 has two weight blocks 24 mounted for pivoting about pins 25 supported in a rotatable bracket 26 operatively connected with the shaft 2 of the turbocompressor 3. An axial thrust bearing 27 establishes actuating connection between the pivotable weight blocks 24 and the rod 23.

The all-speed governor 16 further includes a mechanism 28 for tuning the pickup 22, comprising a follower 29 engaging a cam 30 fast on a shaft 31. This shaft 31 is operatively connected via an arm 32 and a rod 33 pivotably attached to this arm 32 with the "gas" or "throttle" pedal of the vehicle (not shown). A compression spring 34 has one end thereof abutting against the end of the spool valve 18, remote from the centrifugal pickup 22, while the opposite end of this spring 34 abuts against the follower 29.

Thus, the mechanism 28 controls the compression of the spring 34 and in this manner effects the tuning of the action of the centrifugal pickup 22 to the speed of rotation of the turbocompressor 3.

The disclosed regulating system further includes a device 35 for metering the fuel feed, out into the fuel supply line 36 of the engine 1, this fuel supply line 36 being incorporated to supply fuel from a source (not shown) by means of a pump 37 to the combustion chamber 38 of the engine 1, where this fuel is combusted in compressed air preheated in a heat-exchanger 39.

Connected in parallel (in the hydraulic sense) with the pump 37 to the fuel supply line 36 is a valve 40 adapted to maintain a permanent drop of the pressure of the fuel being supplied across the portion of the line 36 between the pump 37 and the combustion chamber 38. The valve 40 may be of any known per se structure, suitable for the purpose, which is not described here because it is irrelevant to the essence of the invention.

The fuel feed metering device or regulator 35 includes a throttle valve 41 in the form of a spool valve 42 received in a sleeve 43 having made therein passages 43a and 43b communicating with the fuel supply line 36.

The fuel feed regulator 35 further includes two sets of bellows 44 and 45 interconnected by a rod 46 operatively connected via an arm 47 and another rod 48 to the spool valve 42.

Pressurized air from the outlet of the compressor 3a of the engine 1 is fed into the bellows 44, while the bellows 45 communicates with ambient atmosphere. In this way the fuel feed controlled by the throttle valve 41 is made dependent on the pressure downstream of the compressor 3a.

The fuel feed metering device or governor 35 further includes a bellows 49 for adjusting the tuning of this governor, the bellows 49 communicating with the oil line 12 controlling the clutch 7 and having the movable flange thereof operatively connected with the movable support 50 of the arm 47.

In accordance with the invention, the disclosed system includes an all-speed governor 51 of the rpm value of the shaft 4 of the power turbine 5. This governor 51 controls the fuel feed when the vehicle is being braked with aid of the engine 1.

The governor 51 includes a metering device 52 in the form of a spool valve 53 received in a sleeve 54. The sleeve 54 has provided therein passages 54a and 54b communicating with the fuel supply line 36, the passage 54a being the inlet one and the passage 54b being the outlet one. The inlet passage 54a is connected to the output of the pump 37, while the outlet passage 54b is connected to the fuel feed regulator 35.

The governor 51 includes a centrifugal pickup 55 responsive to the rpm value of the shaft 4 of the power turbine 5, arranged coaxially with the spool valve 53 and connected therewith via a rod 56, to control the position of this spool valve 53. The design of the pickup 55 is similar to that of the centrifugal pickup 22, described hereinabove.

The all-speed governor 51 also incorporates a mechanism 57 for tuning the pickup 55, including a follower 58 engaging a cam 59 fast on the shaft 31, for synchronized adjustment of the tuning of the pickups 32 and 55 by depression of the "gas" pedal.

A compression spring 60 abuts against the end of the spool valve 53, remote from the centrifugal pickup 55, while the opposite end of this spring 60 abuts against the follower 58.

thus, the mechanism 57 adjusts the compression of the spring 60, in which way the pickup 55 is tuned.

Also in accordance with the invention, the disclosed regulating system comprises an additional metering device 61 included into the fuel supply line 36 of the engine 1, intermediate of the metering device 52 and the throttle valve 41 of the fuel feed regulator 35.

The additional metering device 61 is made integral with the metering device 17 of the all-speed governor 16 of the rpm value of the shaft 2 of the turbocompressor 3. This additional metering device 61 includes a spool valve which is coaxial and fast with the spool valve 18 of the metering device 17 and, therefore, indicated with the same numeral 18, and the sleeve 19 which is also the sleeve of the metering device 17. This sleeve 19 has additionally provided therein an inlet passage 62 communicating with the outlet passage 54b of the metering device 52 and an outlet passage 63 communicating with the throttle valve 41 of the regulator 35.

The sleeve 19 has further made therein auxiliary passages 64 and 65 included in the fuel supply line 36 in parallel with the passages 62 and 63 and adapted to establish a flow of the fuel to the regulator 35 when the metering device 61 is turned off. A drain passage 66 is also provided in the sleeve 66.

In accordance with the invention, the additional metering device is intended for operation in alternation with the metering device 17 of the all-speed governor 16 of the rpm value of the shaft 2 of the turbocompressor 3. For this purpose, as it has been already explained, the sleeve 19 is operatively connected to the "gas" pedal of the vehicle with aid of a follower 67 connected to the sleeve 19 and engaging a cam 68 fast with the shaft 31. The end of the sleeve 19, remote from the follower 67 and cam 68, abuts against one end of a compression spring 69 of which the opposite end abuts against a stationary lug 69a, in which way the spring 69 urges the follower 67 into engagement with the cam 68.

The disclosed regulating system further has a solenoid valve 70 cut into the fuel supply line 36, this solenoid valve 70 being intended to cut off the feed of the fuel into the combustion chamber 38 of the engine 1 when the driver of the vehicle releases the "gas" pedal. The solenoid valve 70 may be of any known per se structure suitable for the purpose. The electric circuit 71 of the solenoid valve 70 includes a power source (indicated in the appended drawing with voltage supply terminals) and make/brake contacts 72 controlling the energization of the solenoid valve 70 and controlled themselves by a bellows 73 communicating with the oil line 12.

The herein disclosed regulating system operates, as follows.

The fuel is supplied by the pump 37 to the metering device 52 of the governor 51 of the rpm value of the power turbine 5. From the metering device 52 the fuel flows to the inlet passage 62 and the auxiliary passage 64 of the additional metering device 61 operatively connected with the pickup 22 responsive to the rpm value of the shaft 2 of the turbocompressor 3, belonging to the all-speed governor 16. From the outlet passage 63 and from the auxiliary passage 65 the fuel flows to the throttle valve 41 of the fuel feed regulator 35 and then flows via the fuel supply line 36 through the solenoid valve 70 into the combustion chamber 38 of the engine 1.

The permanent pressure-drop valve 40 communicates with the outlet of the pump 37 and with the fuel supply line 36, its function being to maintain a permanent pressure drop across the three abovementioned elements, viz. the metering device 52, the additional metering device 61 and the throttle valve 41.

The oil feed to the hydraulic control line 12 of the clutch 7 is effected by the pump 13, the valve 14 communicating with the outlet of the pump 13 maintaining a permanent delivery pressure in any mode of operation.

From the pump 13 the oil flows to the metering device 17 controlled by the pickup 22 of the governor 16 of the rpm value of the shaft 2 of the turbocompressor 3. From the metering device 17 the oil flows to the clutch 7. Some oil flows back from the oil line 12 through the throttle valve 15 to the inlet of the pump 13. The oil pressure at the inlet of the clutch 7 is communicated to the bellows 49 of the fuel feed regulator 35 and to the bellows 73 actuating the contacts 72 in the supply circuit of the solenoid valve 70.

At an established running duty of the turbocompressor 3, when the relative speed of rotation of the shaft 4 of the power turbine 5 is lower than the relative speed of rotation of the shaft 2 of the turbocompressor 3, the spool valve 53 of the metering device 52 of the governor 51 of the rpm value of the power turbine 5 is at its extreme right position (as shown in the appended drawing) and does not influence the fuel feed. At this operating duty the common sleeve 19 of the metering devices 17 and 61 is likewise in its extreme right position, and the additional metering device 61 does not influence the fuel feed, with the fuel flowing unubstructedly through the auxiliary passages 64 and 65. The inlet passage 62 and the outlet passage 63 of the metering device 61 are closed off with the spool valve 18.

At this operating duty the fuel feed is metered exclusively by the throttle valve 41 of the fuel feed regulator 35, from which the fuel flows through the open solenoid valve 70 into the combustion chamber 38 of the engine 1.

The flow passage area of the throttle valve 41, defining the amount of the fuel fed to the combustion chamber 38, is set by the action of the bellows 44 and 45 with aid of the arm 47, in accordance with the air pressure at the outlet of the compressor 3a of the engine 1. The tuning of the fuel feed regulator 35 is effected to follow a preset program of variation of the gas temperature in the combustion chamber 38 in accordance with the rpm value of the turbocompressor 3.

The metering device 17 controlled by the pickup 22 responsive to the rpm value of the turbocompressor 3 controls, in its turn, the oil pressure in the hydraulic control line 12 of the clutch 7, thus maintaining the loading torque of the turbocompressor at a level required to maintain the rpm value of the turbocompressor 3, selected by the depression of the "gas" pedal, with the fuel feed being metered by the regulator 35.

The characteristics of the bellows 49 of the overruling tuning of the regulator 35 are selected so that at the very minimum pressure in the line 12 the flange of the bellows moves upward to displace the movable support 50 of the arm 47, whereby the spool valve 42 is moved in the lower feed direction. In this way at an established operating duty of the turbocompressor 3 the gas temperature in the combustion chamber 38 is maintained lower than during acceleration. On the other hand, the characteristics of the bellows 73 of the fuel feed cut-off device are selected so that at any pressure value in the line 12, short of the preset maximum value, the movable flange (the bottom one in the drawing) of the bellows 73 retains its raised position, whereby the contacts 72 are closed, and the voltage is supplied to the solenoid valve 70 to keep it open.

When the speed of rotation of the power turbine 5 rises on account of a reduced load applied to its shaft 4 and attain the speed of the turbocompressor 3 (in relative values), the overrunning clutch 11 of the torque-transmitting device 6 becomes engaged because of the torque being transmitted from the power turbine 5. The operative connections of the tuning mechanisms 28 and 57 are such that the governors 16 and 51 are always tuned to the same relative speeds of rotation. Therefore, upon the overrunning clutch 11 having become engaged, the governor 51 begins cutting down the fuel feed, toward its complete cutting-off, thus ensuring stable running of the engine 1 both if the load is reduced still further and if the engine-braking mode of operation is commenced.

When the "gas" pedal assumes its position corresponding to idling of the engine, the arm 32 rotates the shaft 31 so that the governors 16 and 51 are tuned to the minumum rpm value. Simultaneously, the sleeve 19 operated by the cam 68 via the follower 67 is driven by the spring 69 into the extreme left (in the appended drawing) position, whereby the inlet passage 20 of the metering device 17 is closed off, and the supply of oil under pressure to the control line 12 of the clutch 7 is discontinued.

On account of the throttle valve 15, the pressure in the oil line 12 drops without delay, and the entire volume of the oil delivered by the pump 13 returns to the latter's inlet via the valve 14. This state of the oil supply corresponds to the clutch 7 being completely disengaged and thus transmitting no torque.

Simultaneously, the auxiliary passages 64 and 65 in the sleeve 19 are closed off, while the passages 62 and 63 become open, whereby the speed of rotation of the turbocompressor 3 is controlled by influencing the fuel feed with the additional metering device 61 of the governor 16.

When the "gas" pedal is put into its position corresponding to the maximum speed of rotation of the turbocompressor 3, the arm 32 tunes the governors 16 and 51 to the maximum-speed duty, and the sleeve 19 attains its extreme left position, owing to the corresponding profile of the cam 68. The system operates in a way similar to its operation in the "idling" duty. The clutch 7 being disengaged, no torque is transmitted, and the speed of rotation of the turbocompressor 3 is set by the governor 16 which influences the fuel feed by means of the additional metering device 61. In this way fine adjustment of the maximum speed of rotation of the turbocompressor 3 is attained.

When the "gas" pedal is shifted to a position corresponding to a partial acceleration of the turbocompressor 3, i.e. to a position whereat the speed of rotation of the turbocompressor 3 is short of the maximum speed (the sleeve 19 being in this case shifted to its position at the extreme right in the appended drawing), the compression of the springs 34 and 60, respectively, of the governors 16 and 51 is increased by their respective cams 30 and 59 having been rotated into a corresponding position, and the spool valves 18 and 53 of the metering devices 17 and 52 are driven to the extreme right in the appended drawing. To spool valve 18 closes off the passage 20 in the sleeve 19, whereby the oil pressure in the oil line 12 drops to zero, and the clutch 7 is disengaged. The fuel is metered by the spool valve - sleeve couple 42,43 of the fuel feed regulator 35.

The movable flange of the bellows 49 moves downward together with the support 50 of the arm 47. In this way the fuel feed regulator 35 is tuned to a higher flow rate of the fuel, whereby the gas temperature within the combustion chamber 38 of the engine is raised at acceleration to a value above that maintained in a set mode of operation.

When the "gas" pedal is shifted to a position corresponding to partial deceleration of the turbocompressor 3, i.e. into a position whereat the rotation speed of the turbocompressor 3, although relatively low, is, nevertheless, above the minimum speed (the sleeve 19 in this case is maintained in its position at the extreme right in the drawing), the spool valve 18 of the metering device 17 is driven into its position at the extreme left in the drawing. The oil pressure in the line 12 is built up to the maximum value. Under the action of this maximum oil pressure the bellows 73 actuates the contacts 72 for breaking, the solenoid valve 70 thus closing, and the fuel feed to the combustion chamber 38 being cut off. In this way the turbocompressor 3 is rigidly decelerated, and the power output of the engine 1 is brought down.

A pilot model of the herein disclosed regulating system has been thoroughly and successfully tested in a gas-turbine engine. The outcome of the testing has proved the abovementioned assets of the regulating system in accordance with the present invention.

What is claimed is:

1. A regulating system for a two-shaft gas-turbine engine including a turbocompressor with its shaft, a power turbine with its shaft and a hydraulically-controlled torque-transmitting device interposed between said shafts, this system comprising: a fuel supply line of the engine; a hydraulic control line of said torque-transmitting device; a gas pedal; an all-speed regulator of the rpm value of said shaft of said turbocompressor, having a metering device, a pickup responsive to the rpm value of said shaft of said turbocompressor, and a mechanism for tuning said pickup, said metering device of said all-speed governor of the rpm value of said shaft of said turbocompressor being cut into said hydraulic control line of said torque-transmitting device; said pickup responsive to the rpm value of said shaft of said turbocompressor, belonging to said all-speed governor of the rpm value of said shaft of said turbocompressor, being adapted to develop control signals controlling said metering device of said all-speed governor of the rpm value of said shaft of said turbocompressor; said mechanism for tuning said pickup responsive to the rpm value of said shaft of said turbocompresssor being operatively connected with said gas pedal; a fuel feed regulator cut into said fuel supply line and controlled by the pressure at the outlet of the compressor of the engine; an all-speed governor of the rpm value of said shaft of said power turbine, having a metering device, a pickup responsive to the rpm value of said shaft of said power turbine and a mechanism for tuning said pickup, said metering device of said all-speed governor of the rpm value of said shaft of said power turbine being cut into said fuel supply line of the engine; said pickup responsive to the rpm value of said shaft of said power turbine, belonging to said all-speed governor of the rpm value of said shaft of said power turbine, being adapted to develop control signals controlling said metering device of said all-speed governor of the rpm value of said shaft of said power turbine; a mechanism for tuning said pickup responsive to the rpm value of said shaft of said power turbine, operatively connected with said mechanism for tuning said pickup responsive to the rpm value of said shaft of said turbocompressor, to provide for timed variation of the tuning of said two pickups.

2. A regulating system, as claimed in claim 1, comprising: an additional metering device cut into said fuel supply line of the engine, controllable by signals coming from said pickup responsive to the rpm value of said shaft of said turbocompressor and adapted for operation in alternation with said metering device of said all-speed governor of the rpm value of said shaft of said turbocompressor.

3. A regulating system, as claimed in claim 2, wherein said metering device of said all-speed governor of the rpm value of said shaft of said turbocompressor and said additional metering device are made in the form of two coaxial rigidly connected spool valves controllable by signals coming from said pickup responsive to the rpm value of said shaft of said turbocompressor and received within a common sleeve having passages for connection, respectively, with said hydraulic control line of said torque-transmitting device and with said fuel supply line of the engine, the sleeve being operatively connected with said gas pedal for motion in response to the motion of said gas pedal, in which way there is effected alternating operation of said metering device of said all-speed governor of the rpm value of said shaft of said turbocompressor and of said additional metering device.

* * * * *